United States Patent Office 3,801,696
Patented Apr. 2, 1974

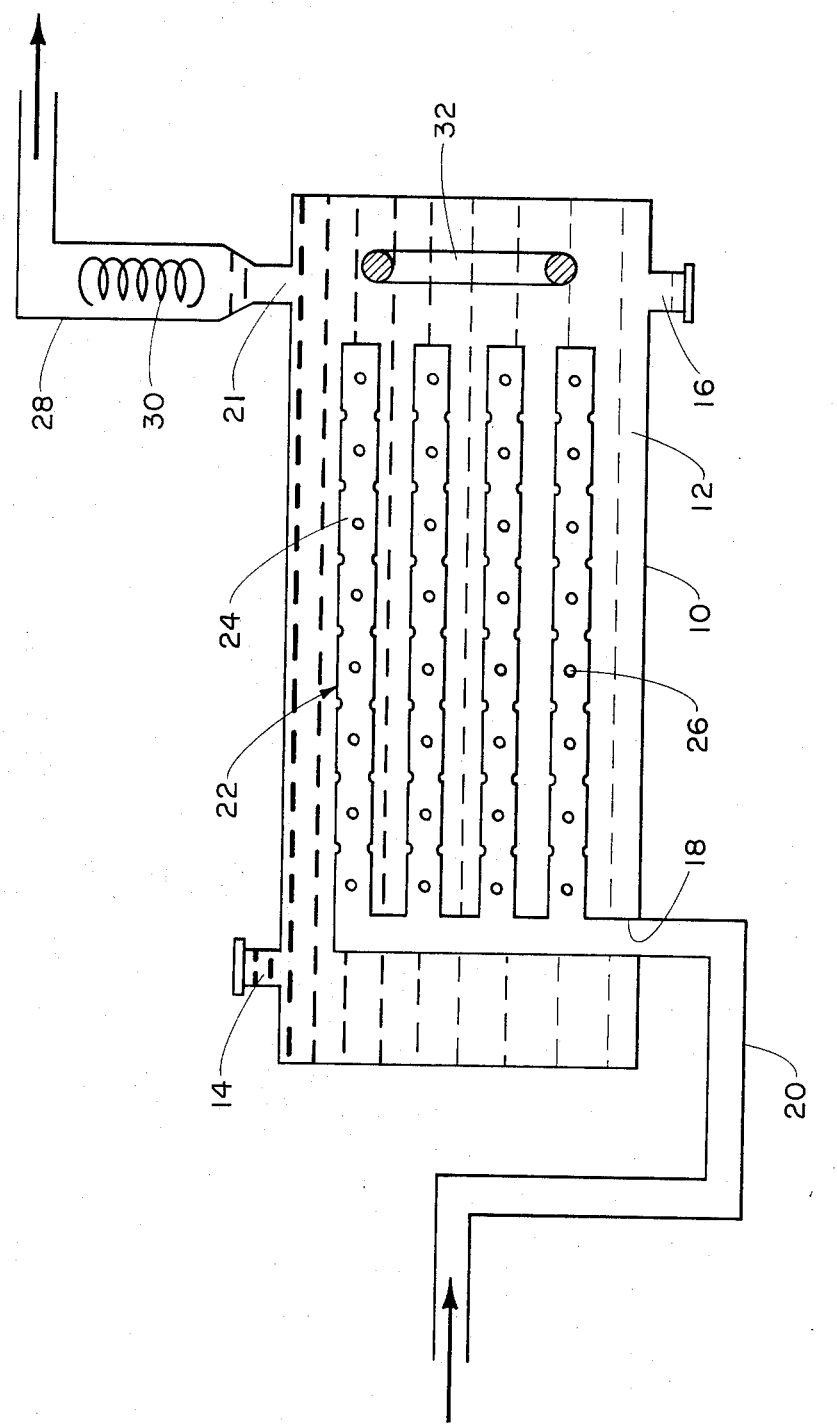

3,801,696
APPARATUS FOR REMOVING NITROGEN
OXIDES FROM ENGINE EXHAUST
Jay Anthony Mark, 6 Balboa Coves,
Newport Beach, Calif. 92660
Filed Nov. 18, 1971, Ser. No. 200,161
Int. Cl. C01b 53/34
U.S. Cl. 423—212
2 Claims

ABSTRACT OF THE DISCLOSURE

A method and apparatus for removing nitrogen oxides from combustion engine exhaust wherein the exhaust is conducted through a urea containing liquid which results in the chemical transformation of the oxides of nitrogen into nitrogen, carbon dioxide and water.

BACKGROUND OF THE INVENTION

The field of this invention relates to apparatus for removing air pollutants from the exhaust gas of a combustion engine and more particularly to an apparatus for removing the particularly offensive air pollutants of oxides of nitrogen.

In general, it has been recognized that pollutants can be removed from gases by washing the gases in suitable liquid solutions. Various attempts have been made to make devices relying on this principle of operation. Previously, a substantial number of difficulties have been encountered such as excessive back pressure being imposed upon the exhaust manifold, therefore adversely affecting engine operation. The devices of the prior art are constantly in need of servicing or repair and normally such devices require frequent cleaning or replacement.

One of the primary smog producing products of exhaust fumes are the compounds of nitrogen such as oxides of nitrogen (NO, $N_2O_3$ and $NO_2$). Previously, there have been attempts at designing an anti-smog device for the purpose of removing the objectionable oxides of nitrogen. However, many of these devices are somewhat complex in design and have been found to substantially reduce the efficiency of the engine without removing a sufficient amount of impurities from the exhaust fumes so as to render the exhaust nontoxic before being liberated to the atmosphere.

It would be desirable to design a nitrogen oxide removing anti-smog device which overcomes the above noted disadvantages.

SUMMARY OF THE INVENTION

The method and apparatus of this invention employs the use of a container which is to be completely filled with a water solution which is saturated with urea. Within the container is located a gas distribution means. Exhaust gases from a combustion engine are to be transmitted within the container and are distributed evenly throughout the liquid by means of the gas distribution means. The exhaust gases will contain a substantial amount of oxides of nitrogen. The oxides of nitrogen within the exhaust gases will chemically react with the urea and result in the production of water vapor, carbon dioxide, and nitrogen. The gases produced from the reaction are to be conducted exteriorly of the container into the ambient. Prior to conduction of these product gases into the ambient, the product gases are passed through the condenser which effects condensation of the water vapor with the retrieved water being replaced into the liquid within the container. It has been found to be desirable to increase the speed of reaction within the liquid by means of a catalyst. A desired form of catalytic material would be metallic copper. However, other forms of catalytic materials may be readily employed in lieu of copper.

BRIEF DESCRIPTION OF THE DRAWING

The figure is a schematic representation of a type of apparatus which may be employed to effect the removal of oxides of nitrogen from exhaust gases.

DETAILED DESCRIPTION OF THE INVENTION

Referring particularly to the drawing, there is depicted a container 10 which is to be completely filled with a liquid 12. The liquid 12 is to be primarily composed of water which is to be saturated with the chemical urea which is commercially available in powdered or granular form and is readily soluble within water. A typical formulation for urea is:

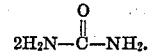

The container 12 includes an access opening 14 and a drain opening 16. The function of the access opening 14 is to permit entry of the urea containing liquid within the container 12. The function of the drain opening 16 is to permit removal of the urea containing liquid from the container 12 prior to replacement.

Also located within the container 10 is an inlet 18 and an outlet 21. The inlet 18 is connected through a first conduit 20 which is to conduct combustion engine exhaust gases from an engine, not shown. The conduit 20 supplies the exhaust gases through the inlet 18 and in a gas distribution means 22 which is located interiorly of the container 10. The gas distribution means 22 includes a series of pipes 24, there being four in number of such pipes shown in the drawing. Each of the pipes 24 is to include a plurality of spaced apart apertures 26. It is the function of each of the apertures 26 to emit a steady thin stream of exhaust gas into the liquid 12. By the employment of the plurality of the pipes 24, the exhaust gases are evenly distributed throughout the entire volume of the liquid 12. This even distribution of the exhaust gas is desired in order to effect complete chemical reaction within the liquid 12.

The gaseous products which are emitted from the liquid 12 are to be passed through the second conduit 28 into the ambient. Within the second conduit 28 is to be located a condenser coil 30. A certain amount of water vapor will be caused to pass into the second conduit 28. It is desired that this water vapor be condensed and the water returned to within the container 10. For this purpose the condenser 30 is provided. It is envisioned that the condenser 30 will be operated by a power source such as a battery or by means of a generator or alternator.

Also located within the container 10 is a metallic ring 32. The metallic ring 32 is to be attached by brackets, not shown, to the interior wall of the container 10. The metallic ring 32 is to be completely immersed within the liquid 12. It is envisioned that the material of construction of the ring 32 is to be primarily copper. The function of the copper ring 32 is to function as a catalyst in the chemical reaction which occurs within the liquid 12. Although copper is preferable as the catalytic material, it is considered to be within the scope of this invention to employ other types of catalytic materials, nonmetallic or metallic.

This invention has been found to facilitate the removal of the oxides of nitrogen from the exhaust fumes of both leaded and unleaded gasoline fuels. Also, the chemical reaction within the liquid 12 takes place with little or no effect on the engine itself.

It is envisioned that the apparatus of this invention will have particular utility in combination with the internal combustion engine of the conventional land vehicle. It is envisioned that the apparatus of this invention would be placed at the end of the exhaust system within the vehicle. Because of the normally constant movement of the vehicle, it is envisioned that there will be no need for a mixing device to effect a complete interspersing of the exhaust gas within the liquid 12. However, it is considered to be within the scope of this invention to employ such a mixing device if the apparatus of this invention is used upon an immovable engine.

In particularly cold environments, it is to be contemplated that some means be employed to not effect freezing of the liquid 12. This can be accomplished chemically or by means of a heater mechanism which will be operated from a power source within the vehicle.

The process of this invention has proven to be extremely effective in the elimination of oxides of nitrogen. The effectiveness of the conversion of the oxides of nitrogen to free nitrogen has been found to have an efficiency of between eighty to ninety-five percent. In one experiment, the initial concentration of urea was 1394 grams in the liquid solution 12. At the end of the test, after the urea had effected transformation of the oxides of nitrogen the concentration of the urea was 279 grams. According to the stoichiometric relationship which was calculated from the flow rate and pressure, this reduction in the amount of urea was equivalent to approximately 450 miles of land vehicle movement.

A second method of analysis was conducted by the Saltzman technique of exhaust analysis. In one test by the Saltzman technique, the oxides of nitrogen were present with also lead oxide and lead dibromide. The initial concentration of oxides of nitrogen 33,160 parts per million with the final concentration being 1330 parts per million. This amount decrease of urea means that a 95% decrease in the amount of oxides of nitrogen occurred.

In testing the effectiveness of the apparatus of this invention, the tests were conducted with oxides of nitrogen concentrations far above an average land vehicle emission to concentrations far below average. Also such tests were conducted with lead present and with lead without being present. In all cases the efficiency was proven to be between 80 to 95% removal of the oxides of nitrogen. It is believed that no known previous apparatus or method can effect this high efficiency of removal of the oxides of nitrogen.

What is claimed as new in support of Letters Patent is:

1. The method of elimination of oxides of nitrogen from combustion engine exhaust gas comprising the steps of:
   locating within a container a liquid bath containing urea;
   placing a copper metal catalyst within the liquid bath;
   substantially evenly distributing into a plurality of thin gaseous streams throughout the bath the engine exhaust which causes the thin streams to break off into a plurality of small bubbles to directly expose the greatest number of the molecules of the engine exhaust to the urea;
   permitting the oxides of nitrogen within the exhaust to chemically react with the urea to produce water vapor and carbon dioxide and nitrogen; and
   removing the gaseous matter generated from the liquid.

2. The method of claim 1 wherein after the step of removing:
   condensing the water vapors from the gaseous matter.

References Cited

UNITED STATES PATENTS

| | | | |
|---|---|---|---|
| 3,528,797 | 9/1970 | Funk et al. | 71—39 |
| 3,565,575 | 2/1971 | Warshaw | 423—235 |
| 3,599,427 | 8/1971 | Jones | 423—212 |

FOREIGN PATENTS

| | | | |
|---|---|---|---|
| 186,985 | 11/1966 | U.S.S.R. | 423—235 |

GEORGE O. PETERS, Primary Examiner

U.S. Cl. X.R.

60—301, 310; 423—235, 213.2